US006411526B1

(12) United States Patent
Nguyen et al.

(10) Patent No.: US 6,411,526 B1
(45) Date of Patent: Jun. 25, 2002

(54) SELF-ALIGNED, PANEL-MOUNTED POWER CORD SET, METHOD OF MANUFACTURE THEREFOR AND AN ELECTRONIC EQUIPMENT CHASSIS EMPLOYING THE SAME

(75) Inventors: An Ba Nguyen; Raymond Rene, both of Richardson; Steven John Vargo, Midlothian, all of TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 0 days.

(21) Appl. No.: 09/525,383

(22) Filed: Mar. 15, 2000

(51) Int. Cl.[7] .................................................. H02B 1/01

(52) U.S. Cl. ....................... 361/829; 361/825; 361/826; 439/954; 439/562; 439/564; 220/4.02

(58) Field of Search ................................ 361/825, 826, 361/829; 206/701, 702; 220/4.02; 439/954, 562, 557, 564, 565, 566

(56) References Cited

U.S. PATENT DOCUMENTS

| | | | | | |
|---|---|---|---|---|---|
| 3,768,064 | A | * | 10/1973 | Pabich | 339/36 |
| 4,812,133 | A | * | 3/1989 | Fleak et al. | 439/248 |
| 4,874,318 | A | * | 10/1989 | Spencer | 439/71 |
| 5,199,900 | A | * | 4/1993 | Hayes, Sr. | 439/557 |
| 5,800,208 | A | * | 9/1998 | Ishizuka et al. | 439/557 |
| 6,163,449 | A | * | 12/2000 | Flegel | 361/601 |
| 6,250,956 | B1 | * | 6/2001 | Pulizzi | 439/535 |

* cited by examiner

*Primary Examiner*—Jayprakash N. Gandhi
*Assistant Examiner*—Thanh S. Phan

(57) ABSTRACT

The present invention provides for a self-aligned, panel mounted cord set, a method of manufacture therefor and an electronic equipment chassis employing the same. One end of the cord set is mounted in an aperture on a panel of an electronic equipment chassis (typically a back panel). The cord set self-aligns when mounted in the aperture to provide a mating connection with an electronic module housed in the chassis. In one embodiment of the invention the self-aligned panel mounted cord set has an elongated body with first and second opposing ends. Coupled to the first end is a power cord configured to mate with an electrical source, such as an AC wall outlet. Coupled to the second end is an electronic module connector configured to mate with the electronic module. About the elongated body is a flange with an alignment post thereon configured to align the elongated body with respect to the panel when positioned in the aperture.

22 Claims, 5 Drawing Sheets

SELF-ALIGNED, PANEL-MOUNTED POWER CORD SET, METHOD OF MANUFACTURE THEREFOR AND AN ELECTRONIC EQUIPMENT CHASSIS EMPLOYING THE SAME

TECHNICAL FIELD OF THE INVENTION

The present invention is directed, in general, to electronics equipment and, more specifically, to a panel mounted cord set that is self-aligning, a method of manufacturing such cord set and an electronic equipment chassis employing such cord set.

BACKGROUND OF THE INVENTION

A modular electronic system, having a plurality of bays into which modules can be inserted, is a commonly-used structure for coupling individual electronic modules (such as power supply modules) together in a configuration that provides a complete system. A power supply is a device used to convert electrical energy from one form to another [e.g., converting an alternating current ("AC") to direct current ("DC"), or vice versa, or to transform an AC or DC voltage to a different level] . A power system may consist of one or more power supplies that may be operated in parallel to provide greater energy capacity. For example, two AC-to-DC converters, each capable of providing 20 amperes of current at a particular output voltage, can be coupled in parallel to provide 40 amperes of current. A modular electronic system is often used in the telecommunication, computer, data networking, and other industries to house various system modules, including AC-to-DC rectifiers, DC-to-DC converters and "ringer" modules.

A chassis of the modular electronic system typically includes a frame that provides the foundation to support a plurality of modules that are coupled through a panel of the chassis to an external power source. In such designs, the electronic module usually receives its power through a connector on the module that mates with a corresponding electrical power connector on the chassis that is coupled via leads to electronic equipment within the module. To supply power to the module, external electrical power (such as AC power from a wall outlet) is routed by a wire to the connector.

The presently available commercial connectors that are used to provide through-panel connections are unsatisfactory for a variety of reasons. In most cases, the module connector receives the electronic module on one side of the panel in a generally acceptable fashion, but the power connector on the other side of the panel consists of a plug with exposed contacts to receive the AC power.

First, the exposed contacts raise safety issues that must be addressed during the installation of the modular electronic system. In addition, each terminal of the plug must frequently be individually wired to the source of electrical power, thereby increasing the cost of assembly and the probability of errors associated with wiring the modular electronic system.

Moreover, the prior art connectors generally fail to provide adequate alignment. Poor alignment between the two connectors can decrease the reliability of the connection between the chassis connections and the electronic module. Additionally, proper alignment (within some degree of acceptable tolerance) is important in those situations in which it is necessary to make a "hot swap" of the module when it is defective or has to be removed for routine maintenance purposes.

Accordingly, what is needed in the art is a coupling device adapted for use with a panel of a modular electronic system that provides connectivity to an electronic module that overcomes the deficiencies in the prior art.

SUMMARY OF THE INVENTION

To address the above-discussed deficiencies of the prior art, the present invention provides for a self-aligned, panel mounted cord set, a method of manufacturing the same and an electronic equipment chassis employing the cord set or the method. One end of the cord set is mounted in an aperture on a panel of an electronic equipment chassis (typically a back panel). The cord set self-aligns when mounted in the aperture to provide a mating connection with an electronic module housed in the chassis. In one embodiment of the invention the self-aligned panel mounted cord set has an elongated body with first and second opposing ends. Coupled to the first end is a power cord configured to mate with an electrical source, such as an AC wall outlet. Coupled to the second end is an electronic module connector configured to mate with the electronic module. About the elongated body is a flange with an alignment post thereon configured to align the elongated body with respect to the panel when positioned in the aperture.

The present invention introduces a cord set mountable to an electronic equipment chassis that provides external electrical power to an electronic module housed in the chassis, without the requirement of using an intervening chassis mounted connector. The cord set has a novel self-alignment feature that assures proper alignment of the cord set's elongated body in the aperture to obtain a mating connection between the electronic module connector and the electronic module.

A beneficial embodiment of the invention provides for a plurality of alignment posts on the flange about the elongated body. Another aspect of this embodiment provides for the alignment posts to be of differing sizes. This is a particularly useful embodiment to assure the elongated body is positively aligned with respect to the panel and positioned so that a correct mating connection with the module is made.

In still another embodiment of the invention, the electronic module connector has a shrouded portion. The shrouded portion can serve several purposes, such as providing alignment assistance and safety advantages. Of course, the shrouded portion is not necessary to practice the present invention. This embodiment, like several of the others described herein, is advantageous because enables the cord set to be used in a number of different jurisdictions with a variety of differing regulatory conventions and standards.

One aspect of the invention provides for the elongated body to be composed of a plastic material. This is particular advantageous because plastic materials are easily molded. The use of plastic material permits ready inclusion in the cord set of the various embodiments described herein. Of course, other materials are also well within the broad scope of the present invention.

Another aspect of the invention provides for the flange to have at least one mounting hole therethrough. This embodiment permits the self-aligned power cord set to be secured to the panel after the elongated body is placed through the aperture in the panel. The positive securement of the cord set to the chassis alleviates the risk of the cord set becoming disconnected if the chassis is moved or shaken by some disturbance, such as an earthquake. Still another aspect of the invention provides for a plurality of mounting holes in the flange, which aspect provides for an even more secure mounting of the cord set to the chassis panel.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
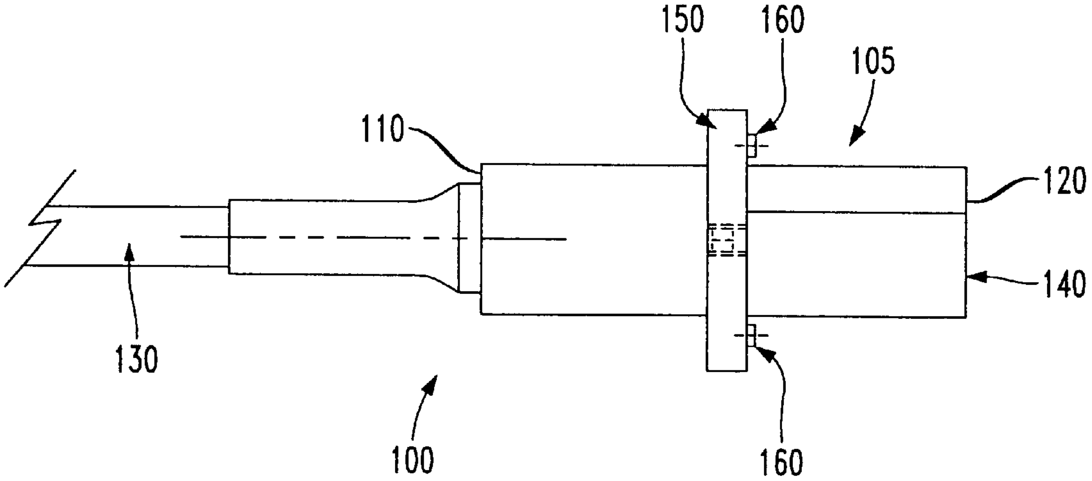
FIG. 1A illustrates a side elevational view on an embodiment of a self-aligned, panel-mounted power cord set constructed in accordance with the principles of the present invention.

Referring initially to FIG. 1A, illustrated is a side elevational view of an embodiment of a self-aligned, panel-mounted power cord set 100 constructed in accordance with the principles of the present invention. The power cord set 100 includes an elongated body 105 having first and second opposing ends 110, 120. Coupled to the first end 110 is a power cord 130 configured to mate with an electrical source (not shown), such as an outlet that provides commercial AC electrical power. Coupled to the second end 120 is an electronic module connector 140 configured to mate with an electronic module.

Figure 3A:
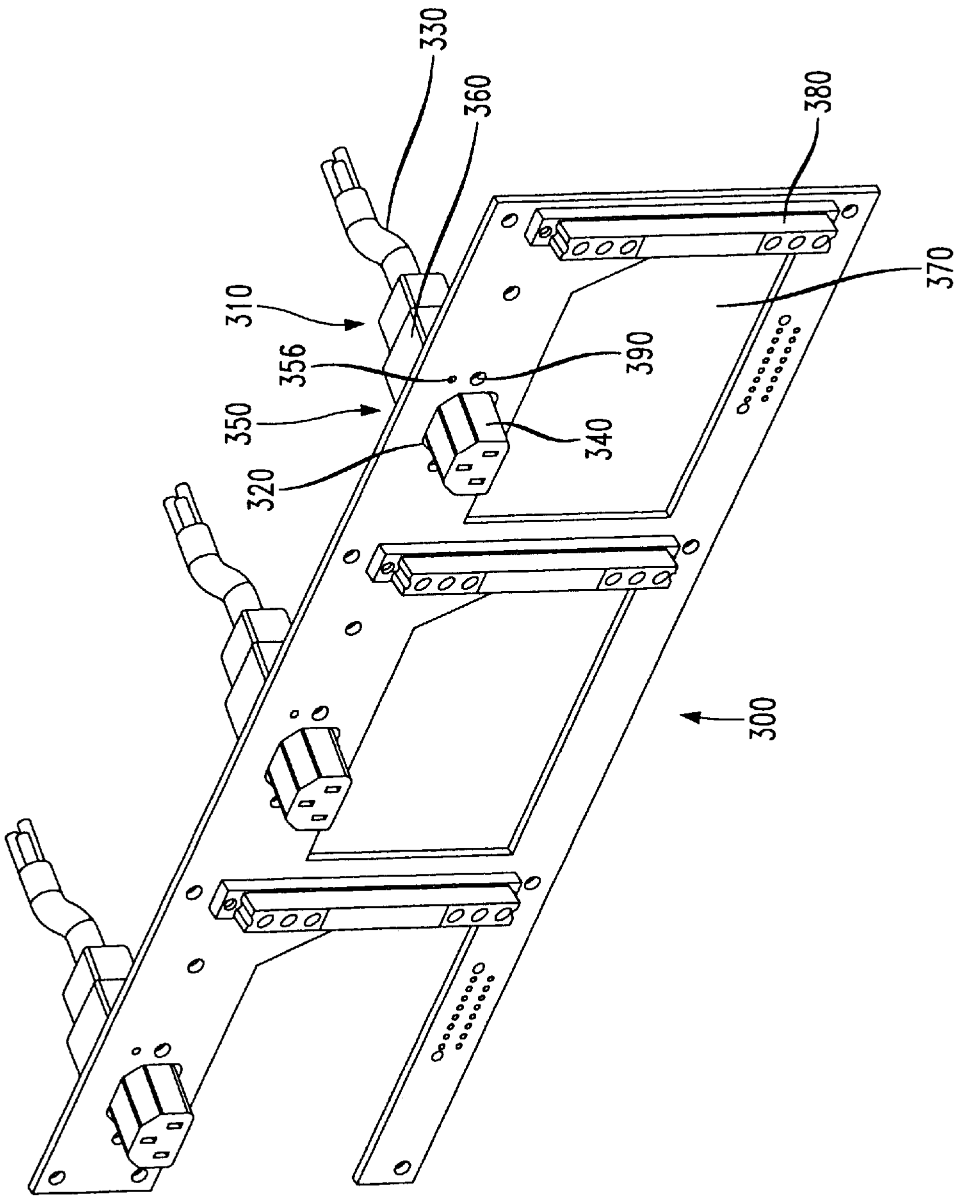
FIGS. 3A and 3B illustrate front and rear isometric views, respectively, of an embodiment of a panel constructed in accordance with the principles of the present invention.
Figure 3B:
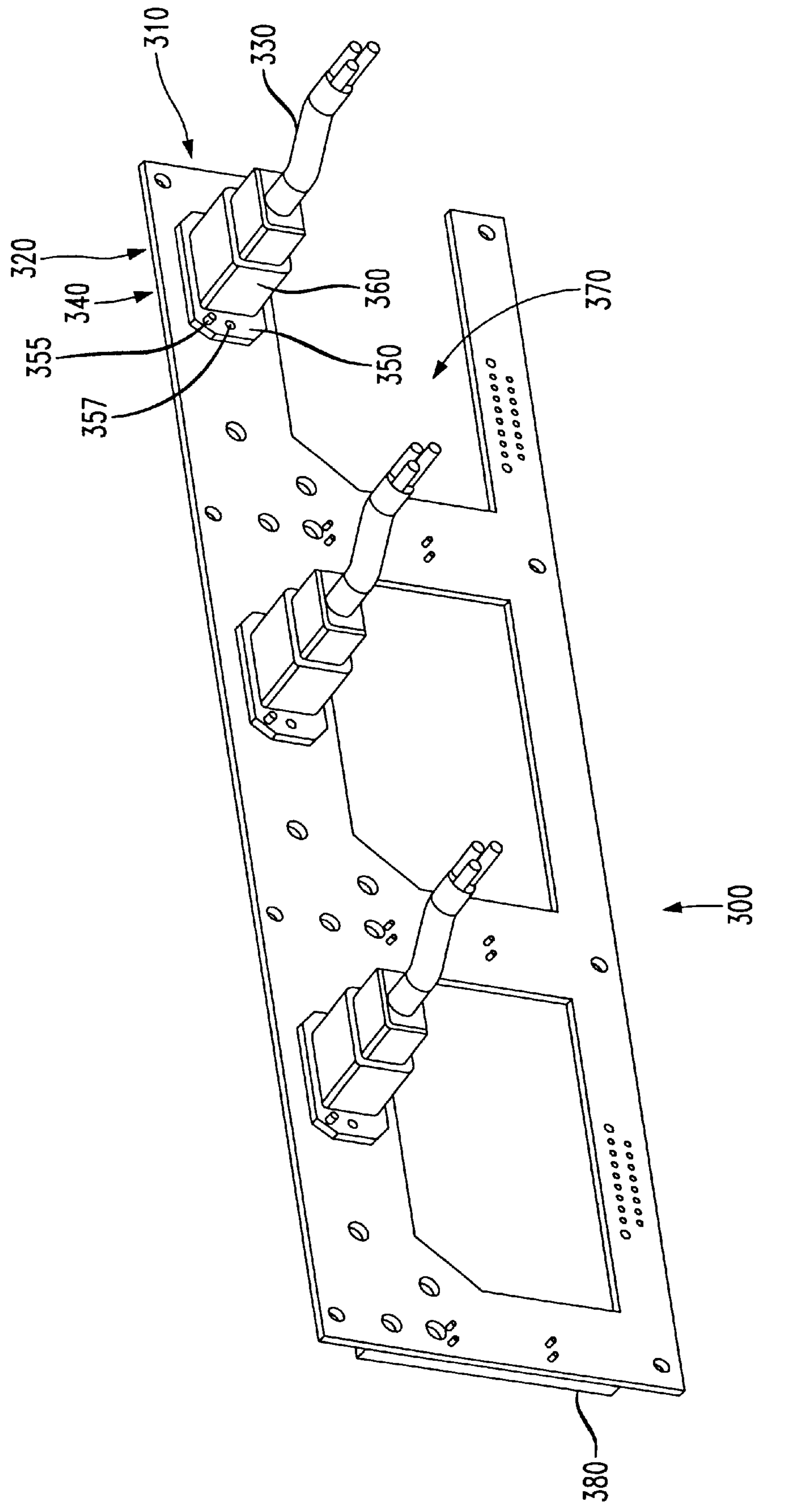

Located about the elongated body 105 of the integrated coupling device 100 is a flange 150 with a plurality of alignment posts 160 that serve to align the power cord set 100 in an aperture of an electronic equipment chassis panel (see FIGS. 3A and 3B). Although a plurality of alignment posts 160 on the flange 150 is a beneficial embodiment of the present invention, a flange 150 with a single alignment post 160 is clearly within the intended scope of the invention.

The elongated body 105 is generally composed of a plastic material such as a polycarbonite or polyamid nylon. This is advantageous because it permits the power cord set 100 to be molded with any or all of the various structural embodiments of the invention molded therein. Of course, other materials may also be employed without departing from the spirit and scope of the present invention.

Figure 1B:
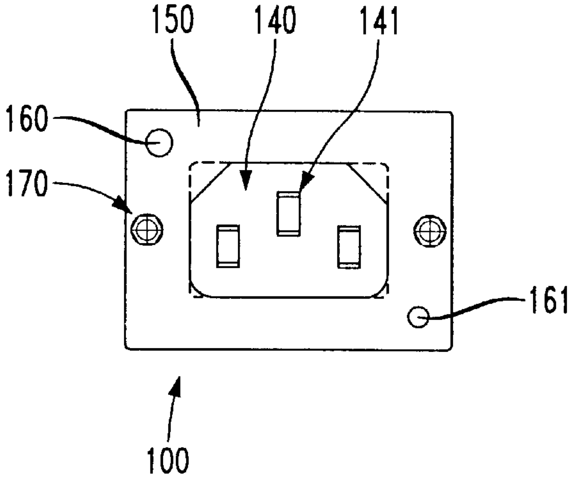
FIG. 1B illustrates an end elevational view of an embodiment of a self-aligned, panel-mounted power cord set oriented with the electronic module connector end of the elongated body visible.

Turning to FIG. 1B, illustrated is an end elevational view of an embodiment of a self-aligned, panel-mounted power cord set 100 oriented with the electronic module connector 140 end of the elongated body 105 visible. In this embodiment, a module connector 140 is illustrated with a plurality of terminals (one of which is designated 141) adapted to mate with a corresponding plurality of blades on a connector on the electronic module. Of course, any configuration of a module connector 140 adapted to mate with an electronic module is well within the broad scope of the present invention.

Located on the flange 150 are different-sized alignment posts 160, 161. The diameter of the alignment post 161 is less than that of alignment post 160. This is a particularly useful feature, because it assures the accurate placement of the elongated body 105 in an aperture in the chassis panel. This feature also assures the elongated body 105 is placed in the panel in an upright position because the different sized alignment posts 160, 161 keep the elongated body 105 from completely seating until each alignment post 160, 161 is matched with a corresponding alignment post receptacle on the panel that fits.

Also shown are a plurality of mounting holes (one of which is designated 170) through the flange 150. This mounting hole 170 is configured to receive a fastener, such as a screw, bolt or clip, that is inserted through the mounting hole 170 and a corresponding hole on the panel to fasten the cord set 100 to the panel. In another embodiment of the invention, the flange 105 only has one mounting hole 170 therethrough. In some embodiments of the invention, the mounting holes 170 may not be required or may be replaced with other mechanisms to secure the cord set 100 to the panel.

Figure 2A:
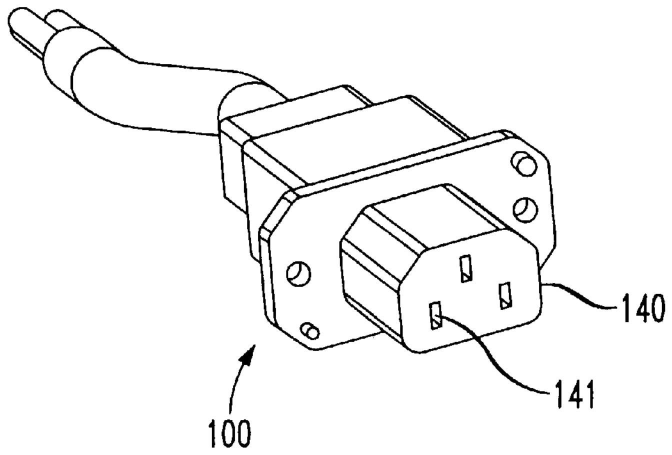
FIGS. 2A and 2B illustrate various isometric views of two embodiments of a self-aligned, panel-mounted power cord set constructed in accordance with the principles of the present invention.
Figure 2B:
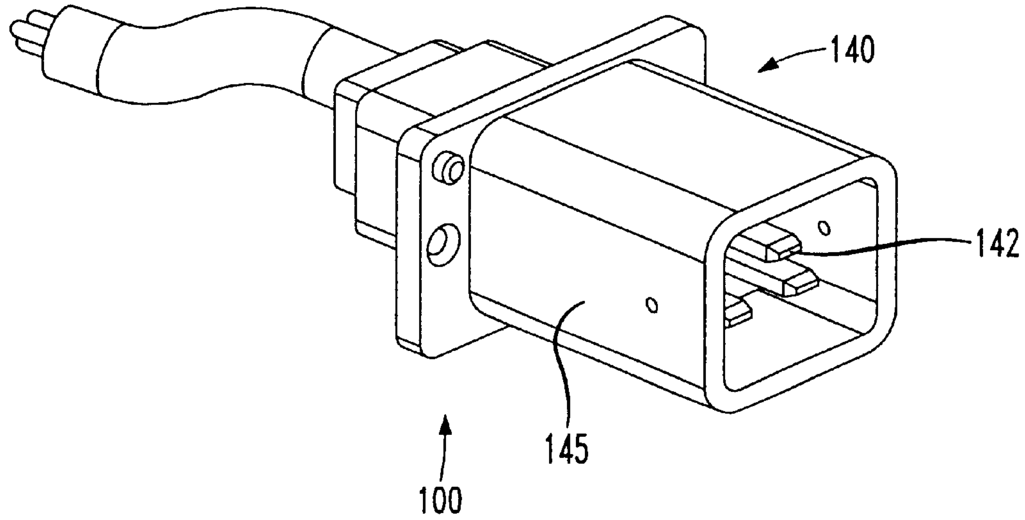

Turning now to FIGS. 2A and 2B, illustrated are isometric views of two embodiments of a self-aligned, panel-mounted power cord set 100 constructed in accordance with the principles of the present invention. Both embodiments show a module connector 140 adapted to mate with an electronic module, but the embodiment in FIG. 2A has a plurality of terminals that are receptacles 141 while the embodiment in FIG. 2B has a plurality of terminals that are blades 142. These are but two of several possible configurations available that can be adapted to mate with an electronic module, all of which are within the intended scope of the present invention.

The embodiment illustrated in FIG. 2B has an electronic module connector 140 with a shrouded portion 145. In addition to protecting the module connector 140 from environmental factors, such as moisture, dust and other contaminants, the shroud 145 also serves as a receptacle to receive an appropriate connector on an electronic module.

Turning now to FIGS. 3A and 3B, illustrated are front and rear isometric views, respectively, of an embodiment of a panel 300 constructed in accordance with the principles of the present invention. The panel 300 (e.g., backplane) includes a plurality of self-aligned, panel-mounted power cord sets (one of which is designated 310) coupled to the panel 300 through a corresponding plurality of apertures 320. The self-aligned, panel-mounted power cord set 310 has a power cord 330 configured to mate with an electrical source, a module connector 340 and a flange 350 about an elongated body 360.

Located on the flange 350 are a plurality of alignment posts 355 and on the panel are a plurality of corresponding alignment post receptacles (one of which is designated 356). The alignment post receptacles 356 are configured to receive the alignment posts 355 and self-align the elongated body 360 in the aperture 320 with respect to the panel 300. When the elongated body 360 is thus positioned through the aperture 320, a uniform mating of the module connector 340 with a corresponding connector on the electronic module is facilitated. See the description with respect to FIGS. 1A and 1B for a more detailed analysis of an embodiment of a self-aligned, panel-mounted power cord set 310.

The panel 300 further includes a plurality of module apertures (one of which is designated 370) to expose the rear wall of electronic modules coupled to the panel 300. The panel 300 still further includes a plurality of signal receptacles (one of which is designated 380) that transmit signals to and from the corresponding plurality of electronic modules.

Also shown are mounting receptacles (one of which is designated 390) configured to receive a fastener, such as a screw, bolt or clip, inserted through mounting holes (one of which is designated 357) on the flange 350 to fasten the cord set 310 to the panel 300. In some embodiments of the present invention, the mounting holes 357 may not be required or may be replaced with other mechanisms to secure the cord set 310 to the panel 300.

Figure 4:
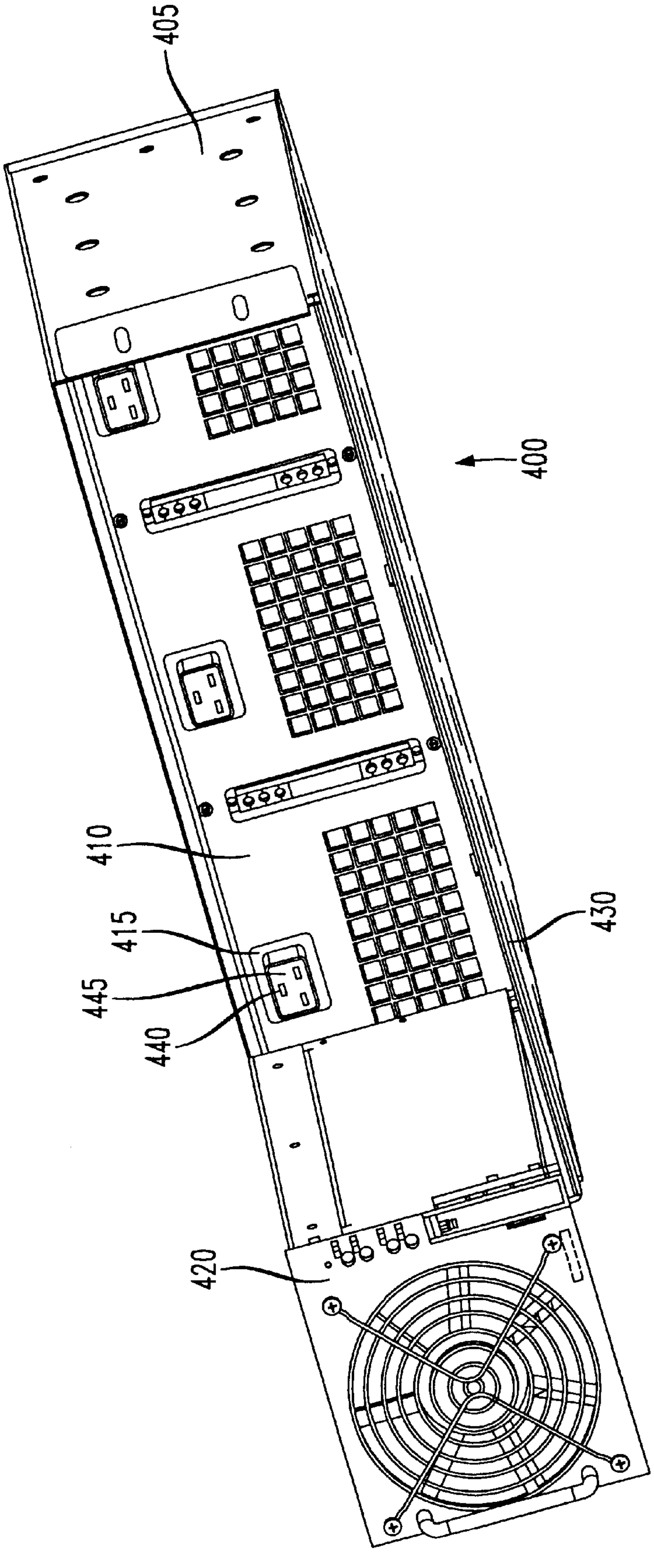
FIG. 4 illustrates an isometric view of a portion of an electronic equipment chassis constructed in accordance with the principles of the present invention with an electronic module contained therein.

Turning now to FIG. 4, illustrated is an isometric view of a portion of an electronic equipment chassis 400 constructed in accordance with the principles of the present invention with an electronic module 420 contained therein. The chassis 400 includes a frame 405 and a panel 410 with an aperture 415 therethrough. The chassis 400 is configured to receive an electronic module 420 that is supported by a shelf 430. In this instance, the panel 410 is secured to the frame 405 and the shelf 430. A self-aligned, panel-mounted power cord set 440 (as described above) is located in the aperture 415 in the panel 410. A module connector 445 on the self aligned, panel-mounted power cord set 440 is adapted to mate with a corresponding connector (not visible) on the electronic module 420 when the module 420 is positioned in the chassis 400.

The invention also provides for several embodiments of methods of manufacturing a self-aligned power cord set. The various embodiments of the invention have been described in sufficient detail herein to enable one of ordinary skill in the art to practice such methods of manufacture.

Although the present invention has been described in detail, those skilled in the art should understand that they can make various changes, substitutions and alterations herein without departing from the spirit and scope of the invention in its broadest form.

What is claimed is:

1. For use with an electronic equipment chassis having a panel with an aperture therein and configured to receive an electronic module, a self-aligned power cord set, comprising:

an elongated body having first and second opposing ends;

a power cord, coupled to said first end, configured to mate with an electrical source;

an electronic module connector, coupled to said second end, configured to mate with said electronic module; and a flange, about said elongated body, having an alignment post thereon configured to align said elongated body with respect to said panel thereby allowing said elongated body to be positioned through said aperture.

2. The self-aligned power cord set as recited in claim 1 wherein said flange has a plurality of said alignment posts thereon.

3. The self-aligned power cord set as recited in claim 2 wherein said plurality of alignment posts are of differing sizes.

4. The self-aligned power cord set as recited in claim 1 wherein said electronic module connector comprises a shrouded portion.

5. The self-aligned power cord set as recited in claim 1 wherein said elongated body comprises a plastic material.

6. The self-aligned power cord set as recited in claim 1 wherein said flange further comprises at least one mounting hole therethrough.

7. The self-aligned power cord set as recited in claim 6 wherein said flange has a plurality of said mounting holes therethrough.

8. For use with an electronic equipment chassis having a panel with an aperture therein and configured to receive an electronic module, a method of manufacturing a self-aligned power cord set, comprising:

providing an elongated body having first and second opposing ends;

providing a power cord configured to mate with an electrical source, said power cord coupled to said first end;

forming an electronic module connector on said second end, configured to mate with said electronic module; and constructing a flange having an alignment post thereon about said elongated body, said flange configured to align said elongated body with respect to said panel thereby allowing said elongated body to be positioned through said aperture.

9. The method of manufacturing as recited in claim 8 wherein said flange has a plurality of said alignment posts thereon.

10. The method of manufacturing as recited in claim 9 wherein said plurality of alignment posts are of differing sizes.

11. The method of manufacturing as recited in claim 8 wherein said electronic module connector comprises a shrouded portion.

12. The method of manufacturing as recited in claim 8 wherein said elongated body comprises a plastic material.

13. The method of manufacturing as recited in claim 8 wherein said flange further comprises at least one mounting hole therethrough.

14. The method of manufacturing as recited in claim 13 wherein said flange has a plurality of said mounting holes therethrough.

15. An electronic equipment chassis, comprising:

a frame;

a panel coupled to said frame and having an aperture therein; and a self-aligned power cord set, including:

an elongated body having first and second opposing ends;

a power cord, coupled to said first end, configured to mate with an electrical source;

an electronic module connector, coupled to said second end, configured to mate with an electronic module; and a flange, about said elongated body, having an alignment post thereon configured to align said elongated body with respect to said panel thereby allowing said elongated body to be positioned through said aperture.

16. The chassis as recited in claim 15 wherein said flange has a plurality of said alignment posts thereon.

17. The chassis as recited in claim 16 wherein said plurality of alignment posts are of differing sizes.

18. The chassis as recited in claim 15 wherein said electronic module connector comprises a shrouded portion.

19. The chassis as recited in claim 15 wherein said elongated body comprises a plastic material.

20. The chassis as recited in claim 15 wherein said flange further comprises at least one mounting hole therethrough.

21. The chassis as recited in claim 20 wherein said flange has a plurality of said mounting holes therethrough.

22. The chassis as recited in claim 15 further comprising an electronic module coupled to said frame and engaging said self-aligned power cord set.

* * * * *